US008382575B2

(12) United States Patent
Mankad

(10) Patent No.: US 8,382,575 B2
(45) Date of Patent: Feb. 26, 2013

(54) SYSTEM AND METHOD FOR IDENTIFYING ERRORS IN SLOT MACHINE AND VIDEO LOTTERY TERMINAL GAMES

(75) Inventor: Jagrat Mankad, Moncton (CA)

(73) Assignee: Speilo Manufacturing ULC, Moncton, New Brunswick (CA)

( * ) Notice: Subject to any disclaimer, the term of this patent is extended or adjusted under 35 U.S.C. 154(b) by 238 days.

(21) Appl. No.: 12/884,281

(22) Filed: Sep. 17, 2010

(65) Prior Publication Data

US 2012/0071224 A1 Mar. 22, 2012

(51) Int. Cl.
*A63F 9/24* (2006.01)
*A63F 13/00* (2006.01)
*G06F 17/00* (2006.01)
*G06F 19/00* (2011.01)

(52) U.S. Cl. .......................................... 463/20; 463/16

(58) Field of Classification Search .................... 463/20
See application file for complete search history.

(56) References Cited

U.S. PATENT DOCUMENTS 4,099,722 A 7/1978 Rodesch et al.
4,283,709 A * 8/1981 Lucero et al. .................. 463/25
4,660,833 A 4/1987 Dickinson et al.
5,119,295 A 6/1992 Kapur
5,548,713 A 8/1996 Petry et al.
6,416,053 B1 7/2002 Kamimura
6,533,664 B1 * 3/2003 Crumby .......................... 463/42
6,790,143 B2 9/2004 Crumby
6,802,778 B1 * 10/2004 Lemay et al. .................. 463/42
6,926,605 B2 8/2005 Nguyen et al.
7,137,885 B1 11/2006 Loose
7,563,166 B2 7/2009 Nguyen et al.
2002/0119815 A1 8/2002 Lyons
2003/0054874 A1 * 3/2003 Kaminkow .................... 463/20
2003/0062682 A1 4/2003 Kato
2003/0100356 A1 * 5/2003 Brown et al. .................... 463/9
2004/0064227 A1 4/2004 Chinnadurai et al.
2004/0259640 A1 12/2004 Gentles et al.
2005/0148385 A1 7/2005 Michaelson
2007/0032285 A1 2/2007 Wolf
2008/0076547 A1 3/2008 Bigelow et al.
2008/0214286 A1 9/2008 Lutnick et al.
2009/0036190 A1 2/2009 Brosnan et al.
2009/0074191 A1 3/2009 Gatto et al.
2009/0124325 A1 5/2009 Wadleigh et al.
2009/0149245 A1 6/2009 Fabbri
2010/0016054 A1 1/2010 Berman et al.
2010/0062833 A1 3/2010 Mattice et al.
2010/0122320 A1 5/2010 Merati et al.
2010/0144415 A1 6/2010 Wolf et al.

OTHER PUBLICATIONS

International Searching Authority, PCT/CA2011/001023, International Search Report, Jan. 6, 2012.

* cited by examiner

*Primary Examiner* — Michael Cuff
*Assistant Examiner* — Kevin Y Kim
(74) *Attorney, Agent, or Firm* — Williams Mullen PC; Thomas F. Bergert

(57) ABSTRACT

The present invention provides a testing system, apparatus and program for efficiently testing VLT games and other games before they are installed. The present invention uses input elements, pay lines and pay table information to generate test cases for each permutation of element combinations. Once the test cases are generated, pay line wins and credit amounts for each test case can be determined. Each of the generated test cases can include a key that can be used with the actual game code to determine if the results generated by the key in the actual game match the results that were determined during testing.

20 Claims, 5 Drawing Sheets

Fig. 1a

10

| Stop Position | Reel 1 | Reel 2 | Reel 3 | Reel 4 |
|---|---|---|---|---|
| 1 | Cherry | Seven | Dollar | Clover |
| 2 | Dice | Star | Cherry | Single Bar |
| 3 | Single Bar | Cherry | Dollar | Dice |
| 4 | Cherry | Seven | Single Bar | Cherry |
| 5 | Dollar | Single Bar | Dice | Dollar |
| 6 | Seven | Dollar | Cherry | Seven |
| 7 | Dice | Cherry | Dollar | Star |
| 8 | Star | Cherry | Star | Cherry |
| 9 | Cherry | Dice | Single Bar | Cherry |
| 10 | Dollar | Star | Seven | Single Bar |

Fig. 1b

12

| | Reel 1 | Reel 2 | Reel 3 | Reel 4 |
|---|---|---|---|---|
| Row 1 | Dollar | Single Bar | Dice | Dollar |
| Row 2 | Seven | Dollar | Cherry | Seven |
| Row 3 | Dice | Cherry | Dollar | Star |

Fig. 2a

13

| Stop Position | Reel 1 | Reel 2 | Reel 3 | Reel 4 |
|---|---|---|---|---|
| 1 | Cherry | Seven | Dollar | Clover |
| 2 | Dice | Star | Cherry | Single Bar |
| 3 | Single Bar | Cherry | Dollar | Dice |
| 4 | Cherry | Seven | Single Bar | Cherry |
| 5 | Dollar | Single Bar | Dice | Dollar |
| 6 | Seven | Dollar | Cherry | Seven |
| 7 | Dice | Cherry | Dollar | Star |
| 8 | Star | Cherry | Star | Cherry |
| 9 | Cherry | Dice | Single Bar | Cherry |
| 10 | Dollar | Star | Seven | Single Bar |

Fig. 2b

15

| | Reel 1 | Reel 2 | Reel 3 | Reel 4 |
|---|---|---|---|---|
| Row 1 | Dollar | Dollar | Dollar | Dollar |
| Row 2 | Seven | Cherry | Cherry | Seven |
| Row 3 | Dice | Cherry | Dollar | Star |

30

| Element | Count | Credits |
|---|---|---|
| Seven | 3<br>4 | 10 x Line Bet<br>20 x Line Bet |
| Single Bar | 3<br>4 | 5 x Line Bet<br>10 x Line Bet |
| Dollar | 3<br>4 | 5 x Line Bet<br>10 x Line Bet |
| Cherry | 3<br>4 | 5 x Line Bet<br>10 x Line Bet |
| Dice | 3<br>4 | 5 x Line Bet<br>10 x Line Bet |
| Clover | 3<br>4 | 25 x Line Bet<br>50 x Line Bet |
| Star | 3<br>4 | 5 x Line Bet<br>10 x Line Bet |

14

16

| **Reel 1** | **Reel 2** | **Reel 3** | **Reel 4** |
|---|---|---|---|
| Cherry | Seven | Dollar | Clover |
| Dice | Star | Cherry | Single Bar |
| Single Bar | Cherry | Dollar | Dice |
| Cherry | Seven | Single Bar | Cherry |

18

SYSTEM AND METHOD FOR IDENTIFYING ERRORS IN SLOT MACHINE AND VIDEO LOTTERY TERMINAL GAMES

FIELD OF THE INVENTION

The present invention pertains to gaming, and more particularly to the testing of slot machine and video lottery terminal games.

BACKGROUND OF THE INVENTION

Slot machines and their video lottery terminal (VLT) equivalents traditionally operate with adjacent vertical reel strips that combine to form a matrix of displayed elements for each spin. For example, a hypothetical set of four reels in their entireties might appear as shown at 10 in FIG. 1*a*, with the shaded portion demonstrating what might be revealed to the player upon executing a spin.

In determining whether a spin has resulted in any winnings, slot machines and VLTs are programmed with pre-determined "pay lines" and "pay tables". In a simple example, a player only wins if the direct horizontal pattern reveals a certain number of matching elements. In such a case, the "pay line" would be a horizontal line for any of the rows in the shaded 3×4 matrix in FIG. 1*a*. These rows are reproduced as shown in the chart 12 in FIG. 1*b*. For example, in FIG. 1*b*, row 1 shows two "Dollar" elements, row 2 shows two "Seven" elements, and row 3 shows no matches.

The pay table dictates the prize awarded if the number of matches reaches a certain level for a certain element in a pay line. For example, if the pay table dictates that three or more "Seven" matches in a pay line wins $10, none of the above highlighted rows would win. If the pay table dictates that two or more "Seven" elements in a pay line wins $50, then row 2 would have a winner of $50. Pay tables can express wins in several ways, including in dollar values, or in a multiple of the player's wager, for example.

The pay lines can be horizontal, diagonal, V-shaped or any other configuration as desired by the operator. For example, if three matching elements in a diagonal line across the FIG. 1*b* matrix 12 constituted a pay line, then the matrix would have a winner on the basis of the "Dollar" element in reel 1, row 1 PLUS reel 2, row 2 PLUS reel 3, row 3. The pay lines can also be changed depending upon the matrix involved. While the highlighted matrix in FIG. 1*a* is 3×4, it will be appreciated that there can obviously be matrices of 3×3, 3×5, 4×5, etc.

A Random Number Generator (RNG) typically determines the stop position of each reel strip during operation. Each reel in the simple example of FIG. 1*a* shows ten stop positions.

Slot machine and other games, whether requiring software or not, must be adequately tested prior to play in order to ensure that proper payouts will be made. In the past, the following steps are typically involved for manual testing of slot and VLT games:

1) An administrative group or department provides the game details to the tester, including, for example, reel strip configurations, payline and payout information for each of the elements that are present in the game. As a result, the game tester knows what the game will payout for different wins (e.g., five of a kind of element X yields Prize A, and 4 of a kind of element Y yields Prize B). The administration game details also provide other game rules and functionality information, such as which element(s) can act like a "wild" element, which element is a "bonus" trigger, which element pays as a "scatter" and whether the game pays for only one direction, for example.
2) Based on the functionalities, market regulations and any other game distinctions or limitations, the game tester knows the pay line configuration for the game. This configuration helps the tester know where each element should appear on the screen to qualify for payout.
3) The game tester then creates test cases (e.g., specific screens) that will make the game process all aspects of the pay table. These test cases contain different checks consisting of all of the elements to make sure that the game is correctly evaluating all payouts on any given screen.
4) The game tester sends numbers (i.e., the required RNG stop positions (outputs)) to the game to create those specific screens that will yield the desired payouts. Then, the game tester plays the game to check if the game is paying out what is expected from it.
5) With wild elements, bonus trigger elements and scatter elements, for example, the game tester needs to create every possible test case (test screen) that might yield a different payout result. This includes negative testing, too, where testers need to check that the game is not paying when it should not.

There are several drawbacks to traditional game testing. First, depending upon the total number of elements, the number of elements per reel, the pay lines and the pay table configuration, manual testing of a single game can take a very long time. Second, a manual game tester can only evaluate one game at a time. Third, the manual game tester generally must test games using a "brute force" method that tests every permutation of every reel. If advanced games, such as those involving wild elements, scatter elements and/or bonus triggers are involved, it becomes even more complicated and time consuming for the manual tester. Past game testing efforts are thus time intensive and highly inefficient.

SUMMARY OF THE PRESENT INVENTION

The present invention overcomes the above deficiencies and more. The present invention provides a testing system, apparatus and program for efficiently testing VLT games and other games before they are installed. The present invention uses input elements, pay lines and pay table information to generate test cases for each permutation of element combinations. Once the test cases are generated, pay line wins and credit amounts for each test case can be determined. Each of the generated test cases can include a key that can be used with the actual game code to determine if the results generated by the key in the actual game match the results that were determined during testing. The present invention also easily accommodates advanced games, such as those involving wild elements, scatter elements and/or bonus triggers.

BRIEF DESCRIPTION OF THE DRAWINGS

FIGS. 1*a* and 2*a* are tables showing a sample matrix of reel displays for a game including four reel strips having ten elements per strip.

FIGS. 1*b* and 2*b* are tables showing a subset of the matrices in FIGS. 1*a* and 2*a*, respectively.

DETAILED DESCRIPTION OF EMBODIMENTS

Figure 3:
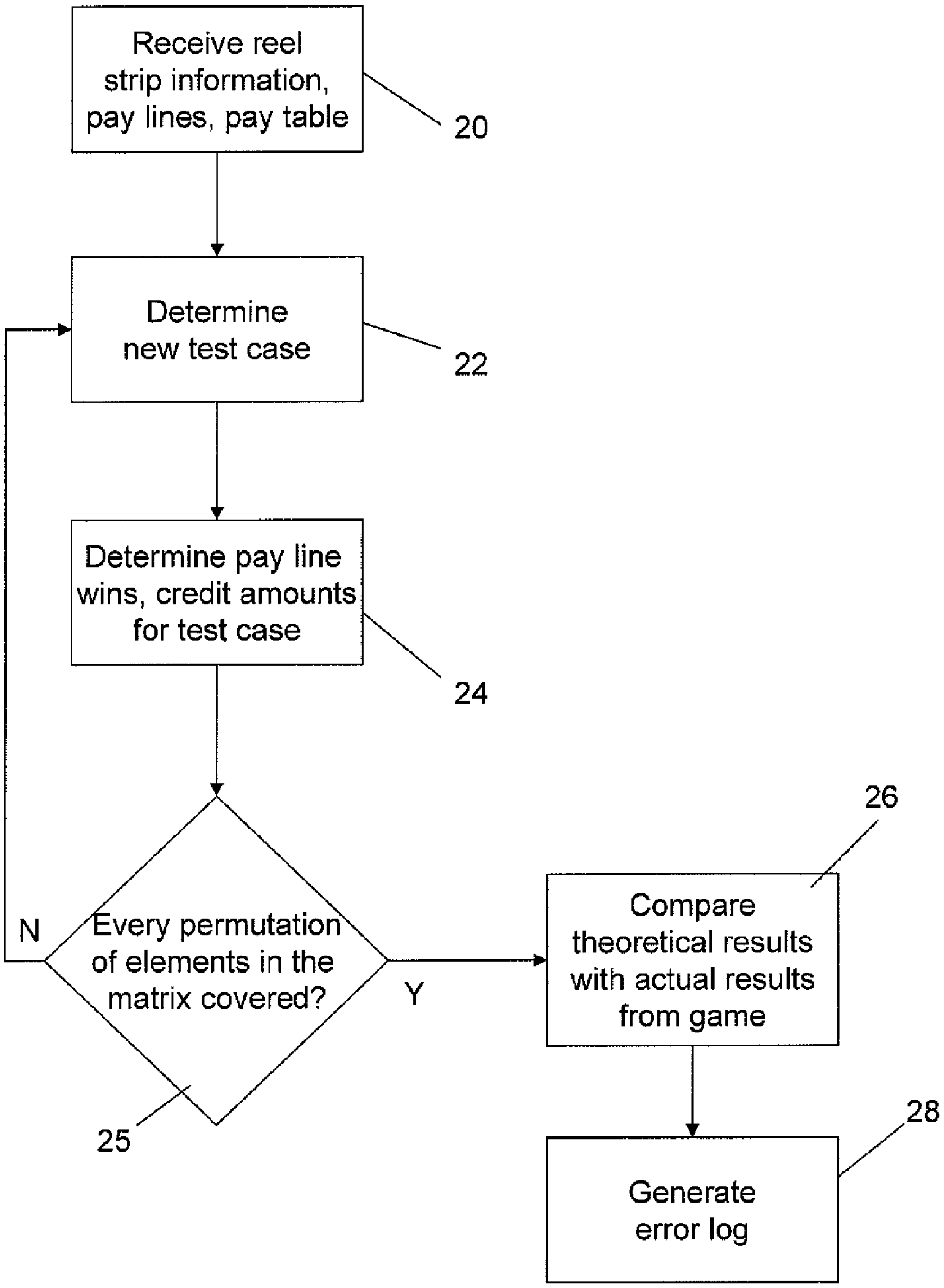
FIG. 3 is a flow chart illustrating a method according to one embodiment of the present invention.
Figures 4, 5:
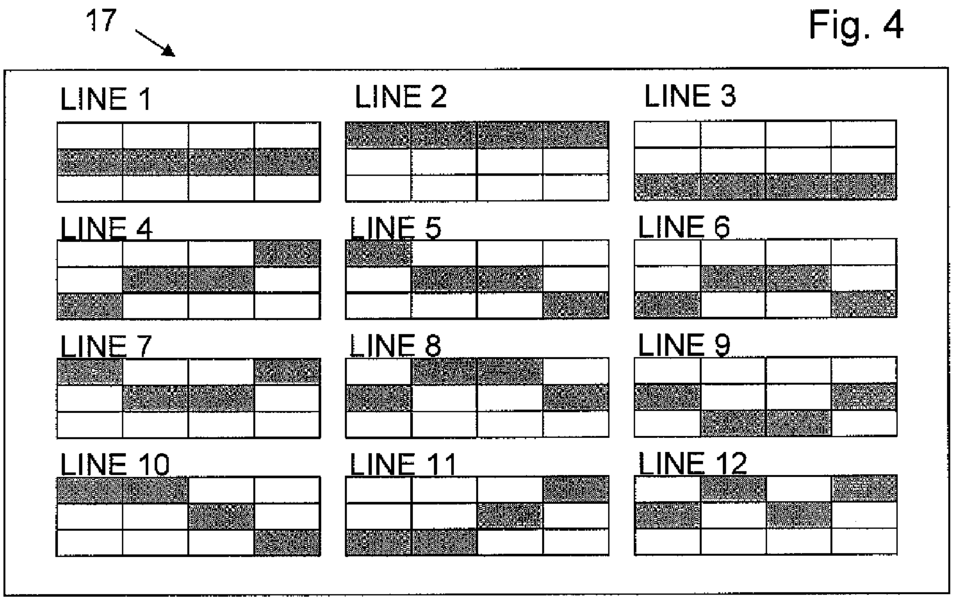
FIG. 4 is a table of sample pay lines for use in illustrating the present invention.
FIG. 5 is a sample pay table for use in illustrating the present invention.

As illustrated in FIG. 3, in one embodiment, the present invention first takes reel strip information, pay line information and pay table information for a game as input as at step 20, and determines, as at step 22, a new test case (e.g., RNG output) required to cover one permutation of elements on the matrix (e.g., Row 1 or the entire matrix on the 3×4 screen illustrated in FIG. 1*b*). A sample set 17 of twelve pay lines for a 3×4 matrix is shown in FIG. 4, and a sample pay table is shown in FIG. 5. A sample test case for the game represented by the matrix in FIG. 1*a*, including an RNG output may be something like, 4, 7, 2, 5, for example, where the "4, 7, 2, 5" numbers represent the stop position of the four reels, respectively.

In an alternative embodiment of the present invention, a sample test case can also include a key (e.g., "8024") such that the RNG output may appear as 4, 7, 2, 5, 8024, for example. The "8024" number represents the random number or key that, when used by the actual game, results in the first reel stopping at position 4, the second reel stopping at position 7, the third reel stopping at position 2 and the fourth reel stopping at position 5. Thus, not only does the test case include the stop locations for each reel, it also includes the key required to generate the specific stop locations involved.

FIGS. 1*a* and 1*b* illustrate an example where the RNG output (i.e., reel stop positions) is 6, 6, 6, 6. The reel stop position indicates, in this instance, the middle row of a 3×4 matrix. The table 13 in FIG. 2*a* and corresponding table 15 in FIG. 2*b* illustrate an example where the RNG output (i.e., reel stop positions) is 6, 7, 2, 6.

Returning to FIG. 3, after deriving test cases for each permutation of reel elements (as opposed to each permutation of the reel strips themselves, which is a "brute force" method), the present invention then inputs those test cases, along with the established pay lines and pay table to compute/determine the pay line wins and associated credit amounts for each test case, as at step 24. If every permutation of reel elements has been accounted for as determined at step 25, the method moves to step 26 described below. If every permutation of reel elements has not been accounted for as determined at step 25, the process moves back to step 22 to develop a new case.

The total number of test cases will be smaller than the total number of possible RNG outcomes because of the repeating elements in each reel strip. For example, Row 1 of the FIG. 1*a* matrix 10 reads, "Cherry, Seven, Dollar, Clover" as reproduced at line 16 in the table segment 14 in FIG. 6. This would be one test case and, depending upon the pay line information, this test case may not be re-recorded if the stop position on Reel 1 ends at the fourth item "Cherry" as indicated by arrow 18, while Reels 2 through 4 stay with the same element. As an example of the contingent determination and recordation of the pay line wins and credit amounts if Reel 1 ends at the fourth stop position, consider the pay line table 17 of FIG. 4. As shown in table 17, pay lines two, five, seven and ten involve pay line wins that include the top left element in the matrix. If this element is the same, which would be the case if Reel 1 stops at position 1 or position 4, then there is no need to re-test pay lines two, five, seven and ten. However, there would still be a need to test the remaining pay lines for stop position 4 because the other elements of Reel 1 would be different as between stop positions 1 and 4. Thus, the overall determination as to whether to test permutations of reel elements will depend upon the reel elements involved and the pay line information received. It will also depend upon the game and the nature of any advanced elements (such as wilds, scatter elements and/or bonus triggers). For instance, with scatter element permutations, the entire grid/screen must be tested as a permutation. While a manual tester may ultimately test every permutation of reel elements, the present invention automatically avoids testing permutations that are redundant and do not need to be re-tested.

In an alternative embodiment, a smaller subset of test cases may only be derived for every permutation of expected wins in the pay table. For example, a test case would be derived for each entry in the table 30 in FIG. 5 (i.e., 3 Sevens, 4 Sevens, 3 Single Bars, 4 Single Bars, etc.). In this way, the total number of test cases would be reduced and well below the total number of permutations of the slot game reels. However, in this embodiment, while the wins in the pay table would be tested, the game would ultimately not be tested to confirm that wins were not being paid out when they were not supposed to be paid out.

In the embodiment of the present invention shown in FIG. 3, after determining the wins and credit amounts for each test case, the present invention compares the theoretical result output by the present invention (i.e., the elements displayed on a screen, which lines have wins and what credit amounts are due) with the actual coded game running on a VLT slot machine, as at step 26. In one embodiment of the present invention, the actual VLT output is compared with the system derived theoretical output using the same computer system.

As at step 28, the present invention can optionally generate an error log, or potentially initiate other corrective or notification actions depending upon the requirements of the environment. An error is a discrepancy between the expected result as output by the present invention and the actual result of the game software running on a VLT. An error could be the result of a mistake in the math, the reel strip configuration, the pay table, or the software coding of the game, for example. In one embodiment of the present invention, automated responses to error discoveries are provided. The output of the present invention and the output of the coded game running on an actual VLT can also be fed into a comparator program which would log any discrepancies as errors.

In one embodiment of the present invention, the inputs (i.e., reel strip configurations, pay lines, pay table) to the present invention are provided in electronic form as XML files or Microsoft Excel™ sheets. Output can be provided in electronic form as a text file with comma separated "cheat" values, for example. The text file can then be provided to game developers and mathematics modelers for further testing. Output can also be provided in electronic form in XML format, for example. In one embodiment of the present invention, the testing apparatus can portray a screen (e.g., matrix of elements) for given test case cheat values, or alternatively can display a test case based upon a given screen. Further, the present invention can permit scrolling of reels to create a particular screen and derive the test case numbers corresponding to that screen, as well as the associated wins. In this way, additional testing can be performed in an easy-to-use environment for the tester. The user can visually create a particular game screen to test a specific scenario.

In one embodiment, a quality assurance tester operating a computer can use the inputs to create test cases displayed on a computer display, in order to ensure the game processes all aspects of the pay table. The tester can also test multiple games and reel combinations at the same time.

In operation, and using the example tables of FIGS. 1*a*, 1*b*, 4 and 5, assume a game involves four reel strips having ten elements each, with a total pool of seven elements (e.g., Cherry, Dollar, Single Bar, Clover, Seven, Star and Dice) and a 3×4 matrix of "in play" items as illustrated in FIG. 1*b*, for example. Assume also the pay lines and pay table are as shown in FIGS. 4 and 5, respectively. The brute force method of checking the wins and credit amounts could proceed as follows:

There are no "Line 1" wins according to the pay table 17 of FIG. 4, because Row 2 of the table 12 in FIG. 1*b* does not show three or four of the same elements. If Row 2 did show three of the same elements, then there would be a winner of the credits corresponding to the matching element shown. For example, three of the "Single Bar" element would result in a credit win of five (5) multiplied by the line bet. Four of the "Single Bar" element would results in a credit win of ten (1) multiplied by the line bet. Similar to Line 1, there are no wins for any of Lines 2 through 6. For Line 7 as shown in FIG. 4, there is a match of three "Dollar" elements. As such, and according to the pay table in FIG. 5, there would be a credit win of five (5) multiplied by the line bet. Thus, if the player had wagered $5 on a line bet in this specific instance, he or she would win $25. None of the remaining pay lines from the displayed results in FIG. 1*b* is a winner.

If any of the elements were determined to be a "wild" element, meaning it could be matched with any other element in order to increase the odds of winning, the brute force method would require a tester to apply every element as a replacement for the wild element, in every instance the wild element is shown. Thus, using FIG. 2 as an example again, if the "Dollar" element is a wild element, then a brute force tester would be required to substitute "Seven", "Dice", and all of the remaining elements for the four instances of the "Dollar" element in the table of FIG. 2 in order to determine the line wins and credit amounts won.

Additionally, if the game being played is a "scatter" game, then a player can win even if there is no line win, but rather just a given number of common elements anywhere in the playing grid. Such games would be extremely time consuming to test manually, as the tester would need to create every possible test screen that might yield a different payout result. This testing would include "negative" testing as well, which tests to confirm that the game is not paying out when it should not be paying out.

Figures 6, 7:
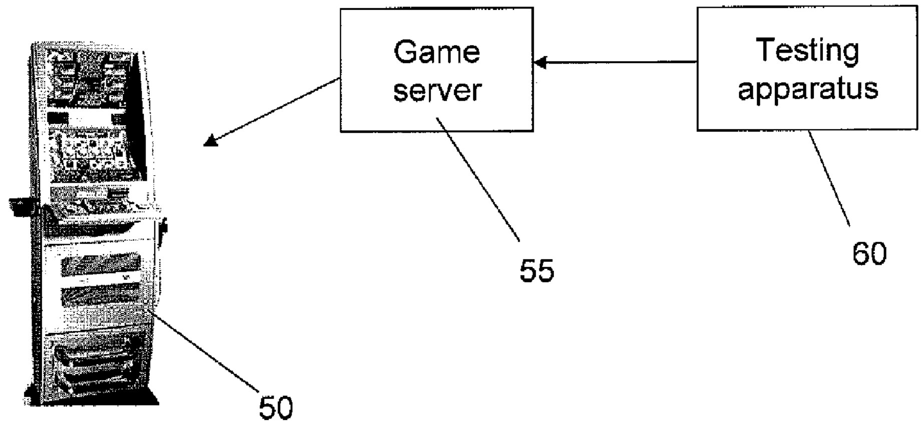
FIG. 6 is an additional table showing a subset of the matrix in FIG. 1.
FIG. 7 is a diagram illustrating components involved in one embodiment of the present invention.

It will be appreciated that the present invention can be embodied as a computer system as shown, for example, in FIG. 7. In such a system, a game machine 50 is provided as a user interface for playing the game, wherein the game machine 50 can be a physical machine at a venue such as a casino, or can be a virtual game machine provided via personal computing device such as a smart phone or home computer, for example. The game machine is in communication via a network with a game server apparatus 55, which is in communication with the testing apparatus 60 of the present invention. In one embodiment of the present invention, the game server 55 and testing apparatus 60 are part of the same computing system, and are further in communication with a back office server (not shown) that performs such functions as random number generation, accounting and communications with banking and venue (e.g., casino) computer systems, for example. In another embodiment of the present invention, the game server 55 hosts a gaming processor or processors, computer memory, programming and different games that are delivered to the game terminal 50 in a server-centric or thin client model. In another embodiment of the present invention, the game terminal 50 hosts the games and associated programming, memory and processor(s) for executing the games, but wherein the game server apparatus 55 hosts the random number generation and accounting programming for the games being played at the terminal 50. The testing apparatus 60 can include a comparator program for comparing the output of the test with the output of an actual game for use in the game terminal 50. It will be appreciated that the random number generation program may be one that continually calculates random outputs, wherein a single random output is selected at a given time (e.g., when a user interacts with an input element (such as pressing a button, pulling a level, etc.)). For example, a random number generator for Reel 1 of FIG. 1*a* may operate so as to output numbers in rapid sequence such as: 4, 3, 9, 5, 5, 6, 10, 2, 7, 6, 4, 8, 3, 3, 9, 5, 6, 1, and so forth, and then when a user interacts with an appropriate input element, it may stop at 5, for example.

Regardless of architecture, the present invention can be embodied as an apparatus including a processor and a storage device in communication with the processor, with the storage device storing a testing program for directing the processor to perform the required steps of the invention. It will be appreciated that the testing apparatus of the present invention is device-, game- and platform-agnostic. The present invention, in one embodiment, provides a standalone application that works independently of the games and can run on a Windows PC, for example. Games and outcome generators are running on their own systems such as server 55 shown in FIG. 7. In one embodiment of the present invention, coded "hooks" are provided in the games themselves, so that the games can consume the test case inputs in either a manual or automated fashion and provide the requisite outcomes.

It will be appreciated that the present invention can be instantiated in the form of an apparatus including a processor, a storage device in communication with the processor, with the storage device storing a testing program for directing the processor to receive slot game reel information for one or several slot game reels, with each slot game reel having a plurality of different game elements for use in a wagering game. The testing program further can receive pay input information including one or more pay lines and a pay table for the wagering game, such as those exemplified in FIGS. 4 and 5. The testing program further can determine a plurality of test cases corresponding to the slot game reel information for every permutation of game elements, and can determine expected game output for the test cases including all possible line wins and credit amounts based on the pay lines and pay table. For example, five different test cases corresponding to the drawing figures may be determined as follows: Test case 1: 2, 2, 5, 9; Test case 2: 6, 4, 2, 8; Test case 3: 9, 8, 7, 4; Test case 4: 5, 7, 3, 3; Test case 5: 1, 4, 1, 3. Each test case would also have an associated set of possible line wins and credit amounts. As complex games can have up to 10,000 possible test cases, it will be appreciated that the computations and possible pay line results can be significantly high. This is further complicated when games involve advanced elements such as wilds, scatter wins and bonus triggers. As shown above in the last element listed in each example test case, at least one of the test cases can include a random number required to generate that test case. Further, the step of determining a plurality of test cases can include establishing a display matrix corresponding to a plurality of game element combinations in play during an individual game play of the slot game, such as the matrix shown in FIG. 2, for example.

The testing program can further compare the expected game output to actual game output derived from the first wagering game program.

The actual game output derived from the slot game program can be derived by inputting one or more random numbers into the slot game program. The one or more random numbers can be derived from at least one of the plurality of test cases.

In one embodiment of the present invention, the display matrix corresponds to a plurality of game element combinations taken from the plurality of slot game reels. In another embodiment of the present invention, each of the plurality of test cases is not determined for every permutation of the plurality of slot game reels.

The testing program can direct the processor to receive slot game reel information and pay input information for a second wagering game program and further to compare expected game output to actual game output for the second wagering game program. The second wagering game program can be provided with pay input information that is different from the first wagering game program pay input information. This can be the case whether the underlying game is the same (e.g., video slots) or different (e.g., one game is a video slot game and a second game is a video poker game).

The step of comparing the expected game output to actual game output can include generating an error log containing any discrepancies between the expected game output and the actual game output, as indicated at step 28 of FIG. 3.

It will be appreciated that the present invention can further be instantiated in the form of an apparatus including a processor, a storage device in communication with the processor, with the storage device storing a testing program for directing the processor to receive game element information, game structure information and game payout information for two different wagering games at the same time, wherein the games are different in that they each have different game element information, different game structure information and/or different game payout information. As exemplified above, one example of two different games would be a video slot game and a video poker game. Another example would be a slot game and a keno game. These different games have different structures. For example, the reels in a slot game can have the same elements, but perhaps in different quantities and arrangements from reel to reel. On the other hand, a video poker game must ensure that the same card is not turned up among the cards in play for a given game (e.g., if the game is five card draw, the game cannot reveal two "King of spades" cards in the same hand, because there is only one King of spades in a traditional deck of poker cards).

Regardless, the testing program of the present invention can determine first and second game test cases respectively corresponding to the game element information for every permutation of game elements for the first and second wagering games, and can determine expected game output for the first and second game test cases, including all possible wins and credit amounts based on the respective game payout information for the first and second wagering games. Further, the testing game can compare the expected game output from the first wagering game to actual game output derived from the first wagering game, and compare the expected game output from the second wagering game to actual game output derived from the second wagering game.

In one embodiment of this aspect of the present invention, the game element information for the first wagering game includes wild elements and the game element information for the second wagering game does not include wild elements. In another embodiment of this aspect of the present invention, the game element information for the first wagering game includes bonus elements or triggers and the game element information for the second wagering game does not include bonus elements or triggers. In another embodiment of this aspect of the present invention, the game structure information for the first wagering game can correspond to a slot game and the game structure information for the second wagering game can correspond to a non-slot game. The game payout information for the first wagering game can include scatter pay lines, and the game payout information for the second wagering game does not include scatter pay lines. The game payout information for the first wagering game can include non-linear pay lines, and the game payout information for the second wagering game does not include non-linear pay lines.

In one embodiment, the expected game output from the first and second wagering games are compared to actual game output derived from the first and second wagering games, respectively, at substantially the same time. The expected game output for a test case can include, without limitation, the line wins and associated credit amounts with each line win, the total credit amounts awarded and a bonus game trigger condition or special feature, for example. The display matrix can correspond to a plurality of game element combinations taken from the plurality of slot game reels. As described above, the plurality of test cases may not be determined for every permutation of the plurality of slot game reels.

It will be appreciated that the present invention can further be instantiated in the form of an apparatus including a processor, a storage device in communication with the processor, with the storage device storing a testing program for directing the processor to receive game element information related to a plurality of game elements, game structure information including at least two variables, and game payout information for a wagering game. The variables can be different reel strip element combinations, different playing cards or playing card combinations or any variables required to play particular games that can be tested in accordance with the present invention.

The testing program can then determine a plurality of test cases corresponding to the game element information for every permutation of the game elements for the wagering game. As described above, the plurality of test cases are not determined for every permutation of the at least two variables as may be done in a brute force method. The testing program can further determine expected game output for each of the plurality of test cases, including all possible wins and credit amounts based on the game payout information for the wagering game, and compare the expected game output from the wagering game to actual game output derived from the wagering game.

In one embodiment of the present invention, output can be provided in two different formats. A first format is a plain text file with each test case containing comma separated cheat values. This text file can then be provided to game developers and/or administrative personnel, who can then use these test cases on their simulation and calculate the outcomes. Outcomes are then compared and stored as final test results. The second format option is XML format. This format allows the program product of the present invention to create files that can be provided as inputs to other system tools. The other tools can consume these inputs and send them one-by-one to the VLT and the player can perform semi-automated or manual tests using the "cheats."

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other non-transitory recording medium, for use with any suitable data processing system. The present invention can further run on a variety of platforms, including Microsoft Windows™, Linux™, Sun Solaris™, HP/UX™, IBM AIX™ and Java compliant platforms, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. An apparatus, comprising:

a processor;

a storage device in communication with the processor, the storage device storing a testing program for directing the processor to:

receive slot game reel information for a plurality of slot game reels, with each of the plurality of slot game reels having a plurality of different game elements for use in a first wagering game program, and wherein at least one of the slot game reels includes multiple instances of the same game element;

receive pay input information including one or more pay lines and a pay table for the first wagering game program;

determine a plurality of test cases corresponding to the slot game reel information for every permutation of game elements, including establishing a display matrix corresponding to a plurality of game element combinations in play during an individual game play of the slot game, wherein the display matrix corresponds to a plurality of game element combinations taken from the plurality of slot game reels and includes multiple instances of the same game element for at least one of the slot game reels;

determine expected game output for the test cases including all possible line wins and credit amounts based on the pay lines and pay table; and compare the expected game output to actual game output derived from the first wagering game program.

2. The apparatus of claim 1 wherein at least one of the plurality of test cases includes a random number required to generate the at least one test case.

3. The apparatus of claim 1 wherein the actual game output derived from the slot game program is derived by inputting one or more random numbers into the slot game program.

4. The apparatus of claim 3 wherein at least one of the plurality of test cases generates the one or more random numbers.

5. The apparatus of claim 1 wherein the plurality of test cases are not determined for every permutation of the plurality of slot game reels.

6. The apparatus of claim 5 wherein the plurality of test cases are determined for every permutation of expected wins in the pay table.

7. The apparatus of claim 1 wherein the testing program can direct the processor to receive slot game reel information and pay input information for a second wagering game program and further to compare expected game output to actual game output for the second wagering game program.

8. The apparatus of claim 7 wherein the second wagering game program has pay input information that is different from the first wagering game program pay input information.

9. The apparatus of claim 1 wherein the step of comparing the expected game output to actual game output includes generating an error log containing any discrepancies between the expected game output and the actual game output.

10. An apparatus, comprising:

a processor;

a storage device in communication with the processor, the storage device storing a testing program for directing the processor to:

receive game element information, game structure information and game payout information for a first wagering game;

receive game element information, game structure information and game payout information for a second wagering game, wherein the second wagering game is of a different type having different game element information, different game structure information or different game payout information from the first wagering game, and wherein at least one of the first and second wagering games includes a plurality of slot game reels wherein at least one of the slot game reels includes multiple instances of the same game element;

determine a plurality of first and second game test cases respectively corresponding to the game element information for every permutation of game elements for the first and second wagering games;

determine expected game output for the first and second game test cases, including all possible wins and credit amounts based on the respective game payout information for the first and second wagering games;

compare the expected game output from the first wagering game to actual game output derived from the first wagering game; and compare the expected game output from the second wagering game to actual game output derived from the second wagering game.

11. The apparatus of claim 10 wherein the game element information for the first wagering game includes wild elements and the game element information for the second wagering game does not include wild elements.

12. The apparatus of claim 10 wherein the game element information for the first wagering game includes bonus elements and the game element information for the second wagering game does not include bonus elements.

13. The apparatus of claim 10 wherein the game structure information for the first wagering game corresponds to a slot game and the game structure information for the second wagering game corresponds to a non-slot game.

14. The apparatus of claim 10 wherein the game payout information for the first wagering game includes scatter pay lines, and the game payout information for the second wagering game does not include scatter pay lines.

15. The apparatus of claim 10 wherein the game payout information for the first wagering game includes non-linear pay lines, and the game payout information for the second wagering game does not include non-linear pay lines.

16. The apparatus of claim 10 wherein the expected game output from the first and second wagering games are compared to actual game output derived from the first and second wagering games, respectively, at substantially the same time.

17. A method, comprising:

receiving, by a computer, slot game reel information for a plurality of slot game reels, with each of the plurality of slot game reels having a plurality of different game elements for use in a first wagering game program, wherein at least one of the slot game reels includes multiple instances of the same game element;

receiving, by the computer, pay input information including one or more pay lines and a pay table for the first wagering game program;

determining, by the computer, a plurality of test cases corresponding to the slot game reel information for every permutation of game elements, including establishing a display matrix corresponding to a plurality of game element combinations in play during an individual game play of the slot game, wherein matrix corresponds to a plurality of game element combinations taken from the plurality of slot game reels and includes multiple instances of the same game element for at least one of the slot game reels;

determining expected game output for the plurality of test cases, by the computer, including all possible line wins and credit amounts based on the pay lines and pay table; and comparing, by the computer, the expected game output to actual game output derived from the first wagering game program.

18. The method of claim 17 wherein at least one of the plurality of test cases includes a random number required to generate the at least one test case.

19. The method of claim 17 wherein the plurality of test cases are not determined for every permutation of the plurality of slot game reels.

20. An apparatus, comprising:

a processor;

a storage device in communication with the processor, the storage device storing a testing program for directing the processor to:

receive game element information related to a plurality of game elements, game structure information including at least two variables, and game payout information for a wagering game, wherein the variables include different reel strip element combinations, including multiple instances of the same game element on a reel strip;

determine a plurality of test cases corresponding to the game element information for every permutation of the plurality of game elements for the wagering game, wherein the plurality of test cases are not determined for every permutation of the at least two variables;

determine expected game output for each of the plurality of test cases, including all possible wins and credit amounts based on the game payout information for the wagering game; and compare the expected game output from the wagering game to actual game output derived from the wagering game.

* * * * *